Nov. 24, 1925.　　　　　　　　　　　　　　　1,562,755
V. A. GIANETTO
MOVING PICTURE MACHINE
Filed Jan. 22, 1924　　　　2 Sheets-Sheet 1
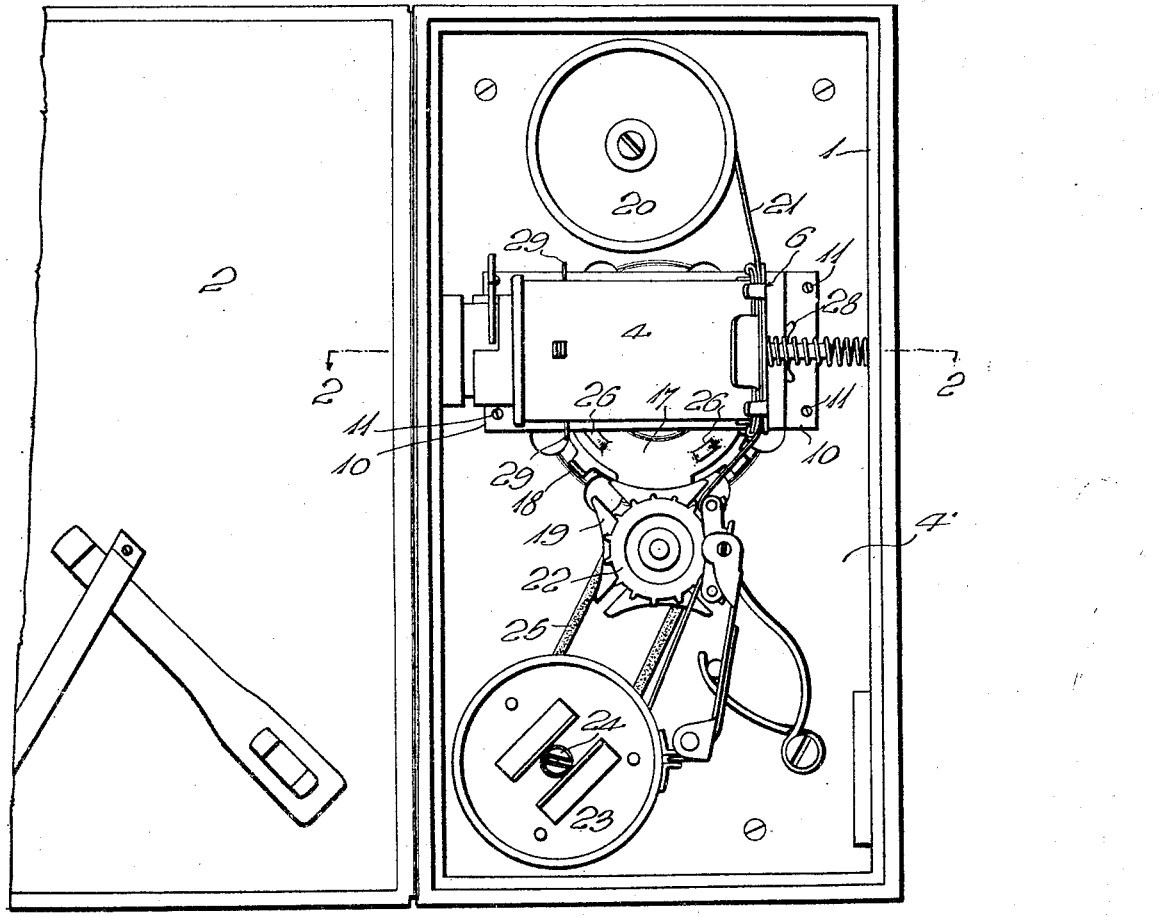
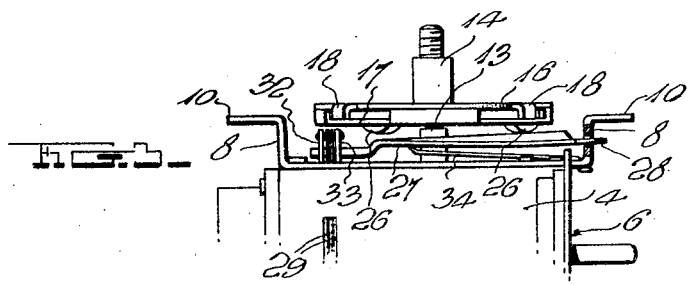
Inventor
Victor A. Gianetto
Witness
H. Woodard
By H. B. Willson &co
Attorneys Nov. 24, 1925.  1,562,755
V. A. GIANETTO
MOVING PICTURE MACHINE
Filed Jan. 22, 1924  2 Sheets-Sheet 2
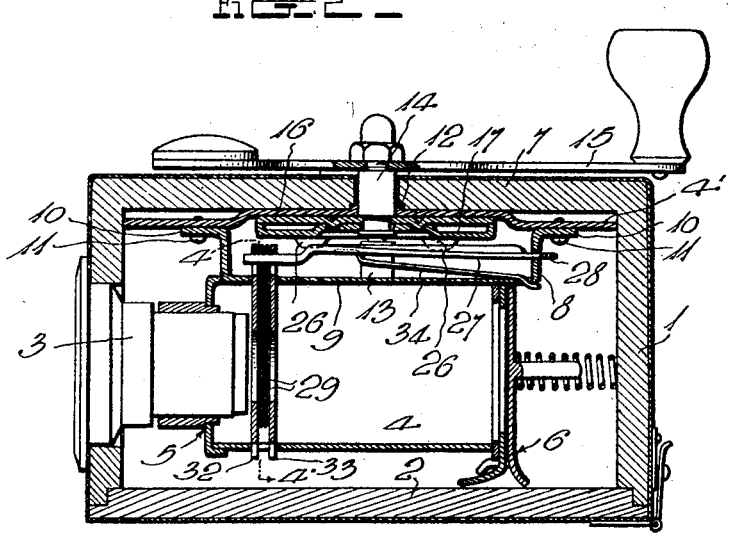
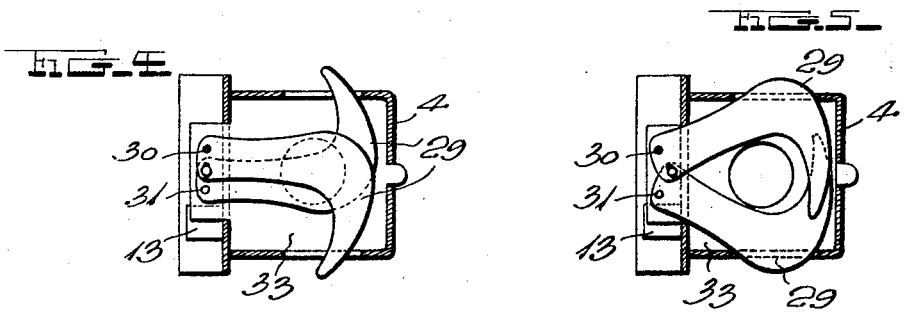
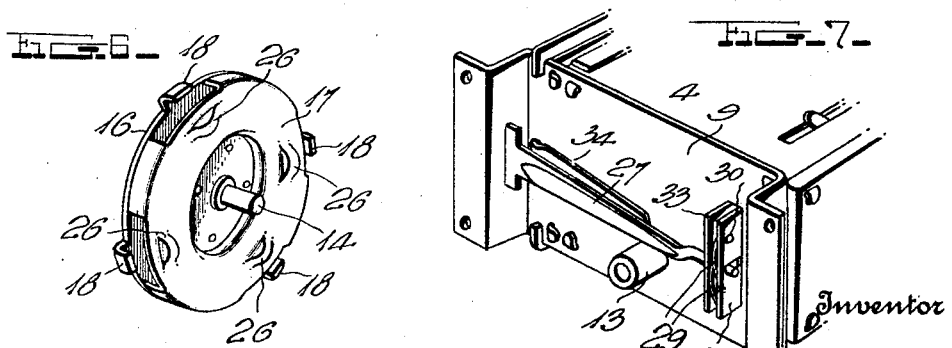

Patented Nov. 24, 1925.

1,562,755

UNITED STATES PATENT OFFICE.

VICTOR A. GIANETTO, OF NEW YORK, N. Y.

MOVING-PICTURE MACHINE.

Application filed January 22, 1924. Serial No. 687,825.

*To all whom it may concern:*

Be it known that I, VICTOR A. GIANETTO, a citizen of the United States, residing at New York, in the county of New York and State of New York, have invented certain new and useful Improvements in Moving-Picture Machines; and I do declare the following to be a full, clear, and exact description of the invention, such as will enable others skilled in the art to which it appertains to make and use the same.

This invention for improvements in moving picture machines relates to an improved simply constructed and cheap film moving and shutter operating mechanism which can be employed either in connection with moving picture cameras or moving picture projection apparatus.

The improved mechanism has been designed so as to have as few parts as possible and so that these parts may be very easily made, preferably by being stamped out of sheet metal, so that the machine in which they are used, whether it be a camera or a projection apparatus, may be made very cheaply and sold for a very low price, to the end that moving picture machines may be owned and used by a large number of persons, the same as ordinary cameras and photographic apparatus.

Among the combinations and arrangements of parts which constitute the novelty in the invention, the essential elements are a wheel by which the film feeding means of the machine can be operated and also by which the shutter mechanism is operated, and a means operated by this wheel for controlling the movement of the shutter. In addition to this, the blades which constitute the shutter itself are mounted in a very unique manner.

In further describing the invention, reference will be had to the accompanying drawings, in which an adaptation of the invention to a moving picture camera is illustrated. In these drawings:—

Fig. 1 is a front elevation of a moving picture camera equipped with mechanism constructed in accordance with the principles of the invention, said view illustrating the cover of the box of the camera as being open;

Fig. 2 is a transverse sectional view through the camera taken on the plane indicated by the line 2—2 of Fig. 1, this view illustrating the cover of the box of the camera as being closed;

Fig. 3 is a side elevation of a portion of a casing which is arranged in the camera box in alinement with the lens, showing the wheel for operating the shutter and the arm which is connected with the shutter and operated by said wheel in the position in which the shutter is opened;

Fig. 4 is a transverse sectional view of a portion of the machine taken substantially on the plane indicated by the line 4—4 of Fig. 2 and illustrating the shutter blades in closed position;

Fig. 5 is a view similiar to Fig. 4, showing the shutter blades in open position;

Fig. 6 is a perspective view of the wheel which operates the shutter mechanism and the film feeding means, and Fig. 7 is a perspective view of the back of the aforesaid casing, showing particularly the manner in which the shutter operating arm is mounted.

Referring more particularly to the drawings in which similar reference characters are used to designate corresponding parts throughout the several views, the numeral 1 represents the box of a moving picture camera, and 2 the cover of the box. Disposed in the box 1 in longitudinal alinement with the lens 3 of the camera, is a hollow casing 4. One end of the case 4 is provided with an opening 5 through which a portion of the lens mounting extends, and the other end of the casing 4 is provided with a film guide 6.

The casing 4 is preferably secured to a base plate 4' upon which all the parts are mounted, this base plate being secured to the back 7 of the box 1. The means for securing the casing 4 to the base plate 4' is preferably in the form of lugs 8, which extend rearwardly from the ends of the back 9 of said casing and which are provided at their free ends with attaching feet 10 engaged by screws 11 engaging the base plate 4'. In this way, the casing 4 is supported in the box 1 with its back 9 spaced from the back 7 of the box 1 or the base plate 4.'

Rotatably mounted in bearings 12 and 13 arranged respectively in the base plate 4' and the back 9 of the casing 4, is a shaft 14 upon which is mounted what may be termed a wheel adapted to be continuously operated to operate the film feeding mechanism and the shutter mechanism of the machine. This shaft 14 extends entirely through the back 7 of the box 1 to the exterior of the box, where it is provided with a crank arm or operating handle 15.

The above mentioned wheel with which the shaft 14 is provided, preferably consists of a pair of flat discs 16 and 17 which are secured together in any suitable manner. The disk 16 is provided around its periphery with a series of pressed out ears having projecting lugs 18. These lugs 18 project laterally from the disk 16 and serve as pins for operating a star wheel 19, which forms a part of the film feeding means for the machine.

In order that the operation of the entire machine will be understood, it will be explained that the unexposed film is disposed in a film magazine 20 and that the film 21 is passed from the magazine 20 through the above described film guide 6 at the end of the hollow casing 4, around sprocket wheels 22 arranged on the shaft of the star wheel 19, and then into a film magazine 23. In the film magazine 23, the film 21 is wound upon a spool 24 which is turned in unison with the star wheel 19 by means of a belt 25.

Formed on one side of the disk 17 and arranged at intervals in a circular series concentric with the axis of the disk, are projections 26, which as will hereinafter appear act in the capacity of cams. Preferably, the projections 26 are formed as pressed out portions of the disc 17.

The disks 16 and 17 constituting the pin wheel of the machine, are arranged close against the base plate 4', so that there is a space between the pin wheel and the back 9 of the casing 4. Arranged in this space is an arm 27. One end 28 of this arm is pivoted to one of the lugs 8 by which the casing 4 is secured to the base plate 4'. The other end of the arm 27 passes through alined apertures arranged in overlapping corners of a pair of shutter blades 29 (see Figs. 4 and 5). These shutter blades 29 are pivoted at 30 and 31 upon plates 32 and 33 which extend transversely through the casing 4 adjacent the lens 3 of the machine.

By reference to Fig. 2 of the drawing, it will be seen that the arm 27 is disposed in the path of the projections 26 so that the arm will be rocked intermittently as it is engaged by the projections. Associated with the arm 27 is a spring 34. One end of this spring 34 bears against the arm 27 and the other end bears against and is secured to a portion of the back 9 of the casing 4.

In order to operate the machine, it is only necessary to rotate the handle 15, as when this is done, the pin wheel will be continuously rotated and the lugs or pins 18 coming into contact with the notches in the star wheel 19 will impart an intermittent movement to the star wheel. This intermittent movement, being imparted to the sprocket wheels 22 and film spool 24, will advance the film 21 intermittently across the end of the casing 4 opposite from the lens 3. As the pin wheel disk 17 rotates, the projections 26 will rock the pivoted arm 27. Anytime the arm 27 is engaged by one of the projections 26, it will be swung so that the shutter blades 29 will take the position shown in Fig. 5, in which position the shutter is open. After the arm 27 has been disengaged by each projection 26, the spring 34 will return it to normal position, in which position, the shutter blades 29 will be closed as shown in Fig. 4. It will therefore be seen that the shutter is intermittently operated as well as the film feeding means but that the shutter is open only during the time that the film feeding means is stationary.

From the foregoing description, taken in connection with the accompanying drawings, the construction, operation, use and advantages of the invention will be readily understood. It will be seen that the improved mechanism, being constructed or stamped entirely out of sheet metal, may be very easily and cheaply made, and that apparatus employing such mechanism may be placed upon the market at a very reasonable price.

It is obvious that various changes in form, proportion, and in the numerous details of construction, may be resorted to without departing from the spirit and principle of the invention, or sacrificing any of the advantages thereof, so that it is to be understood that such changes may be made within the meaning and scope of the appended claims, which define what is believed to be the novelty contained in the invention.

What is claimed is:

1. A moving picture machine comprising a casing having an opening, a lens arranged adjacent said opening, a shutter for said lens, means for guiding a film past said lens, a sprocket wheel for moving said film, a star wheel on the same shaft with and directly connected to said sprocket wheel, a pin wheel adapted to be continuously driven coacting with said star wheel, said pin wheel being formed with a flat disk body and with a plurality of pressed out ears having laterally extending lugs for engaging said star wheel for moving the same, said pin wheel also having a plurality of cams struck out therefrom from one side, and means actuated by said cams for operating said shutter.

2. A machine of the character described comprising a casing having an opening, a lens arranged opposite said opening, a shutter arranged adjacent said lens and mounted to move in a plane to open and closed positions, an upper film reel arranged in said casing, a lower film reel arranged in said casing, means for guiding the film past the lens from the upper reel to the lower reel, a sprocket wheel for moving the film, a star wheel on the same shaft with and directly connected to the sprocket wheel, an endless belt for moving the lower reel from the sprocket wheel, a manually actuated pin wheel for moving said star wheel, cams formed on said pin wheel, and means actuated by said cams for operating said shutter.

3. In a shutter mechanism for moving picture machines, the combination of a casing disposed in the box of the machine in alinement with the lens thereof and provided at one end with a film guide, means for securing said casing to the back of the box of the machine, said means including attaching lugs secured to said back and spacing the back of said casing from the back of said box, a driving wheel adapted to be continuously operated for operating the machine, rotatably mounted between the back of said casing and the back of said box, projections formed on one side of said wheel and arranged at intervals in a circular series concentric with the axis thereof, a spring pressed arm pivoted at one end to one of said lugs and arranged to be engaged by said projections and rocked intermittently as said wheel is rotated, a shutter mounted in the other end of said casing and operatively connected to the other end of said arm, and means intermittently operated by said wheel for intermittently moving a film through said film guide across said shutter.

4. In a moving picture machine, the combination with a shutter and film moving means including a star wheel, of a single driving wheel adapted to be continuously operated and provided with a series of pins to engage and intermittently operate said star wheel, projections formed on one side of said wheel and arranged at intervals in a circular series concentric with the axis thereof, and a spring pressed pivoted arm arranged to be engaged by said projections and rocked intermittently as said wheel is rotated, said arm being operatively connected to said shutter.

5. In a moving picture machine, the combination with a shutter and film moving means including a star wheel, of a single driving wheel mounted in said machine and adapted to be continuously operated for operating said machine, said wheel being composed of a pair of disks secured together, one of said disks being provided around its periphery with a series of projecting lugs forming pins adapted to engage and intermittently operate said star wheel, projections formed on one side of the other disk and arranged at intervals in a circular series concentric with the axis thereof, and a spring pressed pivoted arm arranged to be engaged by said projections and rocked intermittently as said wheel is rotated, said arm being operatively connected to said shutter.

In testimony whereof I have hereunto affixed my signature.

VICTOR A. GIANETTO.